(12) United States Patent
Koonankeil

(10) Patent No.: US 11,673,200 B2
(45) Date of Patent: Jun. 13, 2023

(54) FORMING COOLING APERTURE(S) USING ELECTRICAL DISCHARGE MACHINING

(71) Applicant: Raytheon Technologies Corporation, Farmington, CT (US)

(72) Inventor: James M. Koonankeil, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/401,974

(22) Filed: Aug. 13, 2021

(65) Prior Publication Data

US 2023/0049453 A1 Feb. 16, 2023

(51) Int. Cl.
| | | |
|---|---|---|
| B23H 5/04 | (2006.01) | |
| B24C 1/04 | (2006.01) | |
| B23K 101/00 | (2006.01) | |
| B23K 26/382 | (2014.01) | |

(52) U.S. Cl.
CPC .............. *B23H 5/04* (2013.01); *B23K 26/389* (2015.10); *B23K 2101/001* (2018.08); *B24C 1/045* (2013.01)

(58) Field of Classification Search
CPC ........ B23H 5/04; B24C 1/045; B23K 26/389; B23K 2101/001
See application file for complete search history.

(56) References Cited

U.S. PATENT DOCUMENTS

| | | |
|---|---|---|
| 4,762,464 A | 8/1988 | Vertz |
| 6,234,755 B1 | 5/2001 | Bunker |
| 6,329,015 B1 * | 12/2001 | Fehrenbach ......... B23K 26/389 427/142 |
| 6,368,060 B1 * | 4/2002 | Fehrenbach .......... F04D 29/584 416/97 R |
| 6,420,677 B1 | 7/2002 | Emer |

(Continued)

FOREIGN PATENT DOCUMENTS

| | | |
|---|---|---|
| CN | 111665806 A | 9/2020 |
| EP | 985802 A | 3/2000 |

(Continued)

OTHER PUBLICATIONS

Thomaidos et al. "Hybridbohrverfahren mittels Funkenerosion & Ultraschallbearbeitung", Sep. 2, 2014, Prior Art Journal 2014 #17, p. 93.

(Continued)

*Primary Examiner* — David P Bryant
*Assistant Examiner* — Christine Bersabal
(74) *Attorney, Agent, or Firm* — Getz Balich LLC

(57) ABSTRACT

A manufacturing method is provided. During this method, a preform component is provided for a turbine engine. The preform component includes a substrate comprising electrically conductive material having an outer coating comprising non-electrically conductive material applied over a surface of the substrate. A preform aperture is formed in the preform component using an electrical discharge machining electrode. The preform aperture includes a meter section of a cooling aperture in the substrate. The preform aperture also includes a pilot hole in the outer coating. A diffuser section of the cooling aperture is formed in at least the outer coating using a second machining process.

18 Claims, 9 Drawing Sheets

(56) References Cited

U.S. PATENT DOCUMENTS

| | | |
|---|---|---|
| 6,663,919 B2 | 12/2003 | Farmer |
| 6,909,800 B2 | 6/2005 | Vaidyanathan |
| 7,019,257 B2 | 3/2006 | Stevens |
| 7,041,933 B2 | 5/2006 | Forrester |
| 7,328,580 B2 | 2/2008 | Lee |
| 7,820,267 B2 | 10/2010 | Fahndrich |
| 7,964,087 B2 | 6/2011 | Lee |
| 7,997,868 B1 | 8/2011 | Liang |
| 8,057,181 B1 | 11/2011 | Liang |
| 8,157,526 B2 | 4/2012 | Beck |
| 8,168,912 B1 | 5/2012 | Liang |
| 8,245,519 B1 | 8/2012 | Liang |
| 8,672,613 B2 | 3/2014 | Bunker |
| 8,814,500 B1 | 8/2014 | Liang |
| 8,905,713 B2 | 12/2014 | Bunker |
| 9,468,991 B2 | 10/2016 | McDowell |
| 9,518,317 B2 | 12/2016 | Eminoglu |
| 9,598,979 B2 | 3/2017 | Reed |
| 9,650,900 B2 | 5/2017 | Malak |
| 9,696,035 B2 | 7/2017 | Starkweather |
| 9,765,623 B2 | 9/2017 | Kottilingam |
| 9,945,233 B2 | 4/2018 | Tanaka |
| 10,006,293 B1 | 6/2018 | Jones |
| 10,113,433 B2 | 10/2018 | Morris |
| 10,208,602 B2 | 2/2019 | Thornton |
| 10,280,763 B2 | 5/2019 | Torkaman |
| 10,350,684 B2 | 7/2019 | Bunker |
| 10,619,499 B2 | 4/2020 | Kottilingam |
| 10,815,796 B2 | 10/2020 | Burd |
| 2005/0092725 A1 | 5/2005 | Byrd |
| 2009/0169394 A1 | 7/2009 | Crow |
| 2009/0248355 A1 | 10/2009 | Kriegmair |
| 2010/0282721 A1 | 11/2010 | Bunker |
| 2012/0102959 A1 | 5/2012 | Starkweather |
| 2012/0167389 A1* | 7/2012 | Lacy ............... F01D 5/186 29/889.1 |
| 2012/0205355 A1 | 8/2012 | Münzer |
| 2013/0045106 A1* | 2/2013 | Lacy ............... F01D 5/186 428/137 |
| 2014/0186164 A1 | 7/2014 | Koonankeil |
| 2014/0271129 A1 | 9/2014 | Mueller |
| 2016/0031049 A1* | 2/2016 | Menke ............. F01D 5/186 29/889.7 |
| 2016/0356498 A1 | 12/2016 | Gerendas |
| 2017/0089579 A1 | 3/2017 | Bunker |
| 2017/0261208 A1 | 9/2017 | Starkweather |
| 2017/0320163 A1 | 11/2017 | Hu |
| 2017/0335691 A1 | 11/2017 | Crites |
| 2018/0010484 A1* | 1/2018 | Reed ............... F23R 3/002 |
| 2019/0085705 A1 | 3/2019 | Webster |
| 2019/0101004 A1 | 4/2019 | Rudolph |
| 2019/0134752 A1 | 5/2019 | Grafton-Reed |
| 2020/0190990 A1 | 6/2020 | Hohenstein |
| 2020/0217207 A1 | 7/2020 | Loebig |
| 2021/0060709 A1 | 3/2021 | Thayer |

FOREIGN PATENT DOCUMENTS

| | | |
|---|---|---|
| EP | 1967696 B1 | 3/2017 |
| EP | 2886798 B1 | 10/2018 |
| GB | 2389330 B | 5/2004 |
| WO | 2020068130 A1 | 4/2020 |

OTHER PUBLICATIONS

EP search report for EP22190368.5 dated Jan. 12, 2023.

* cited by examiner

FORMING COOLING APERTURE(S) USING ELECTRICAL DISCHARGE MACHINING

BACKGROUND OF THE DISCLOSURE

1. Technical Field

This disclosure relates generally to a turbine engine and, more particularly, to cooling apertures and formation thereof in a component of the turbine engine.

2. Background Information

A gas turbine engine includes various fluid cooled components such as turbine blades and turbine vanes. Such fluid cooled components may include one or more cooling apertures extending through a sidewall of the respective component. Various methods are known in the art for forming cooling apertures. While these known cooling aperture formation methods have various benefits, there is still room in the art form improvement.

SUMMARY OF THE DISCLOSURE

According to an aspect of the present disclosure, a manufacturing method is provided. During this method, a preform component is provided for a turbine engine. The preform component includes a substrate comprising electrically conductive material having an outer coating comprising non-electrically conductive material applied over a surface of the substrate. A preform aperture is formed in the preform component using an electrical discharge machining electrode. The preform aperture includes a meter section of a cooling aperture in the substrate. The preform aperture also includes a pilot hole in the outer coating. A diffuser section of the cooling aperture is formed in at least the outer coating using a second machining process.

According to another aspect of the present disclosure, another manufacturing method is provided. During this method, a preform component is provided for a turbine engine. The preform component extends between a component first surface and a component second surface. The preform component includes a substrate comprising electrically metal and an outer coating comprising ceramic applied over a surface of the substrate. A preform aperture is formed in the preform component starting at the component first surface using an electrical discharge machining process. The preform aperture includes a meter section of a cooling aperture in the substrate. The preform aperture also includes a pilot hole in the outer coating. A diffuser section of the cooling aperture is formed in at least the outer coating using a second machining process.

According to still another aspect of the present disclosure, another manufacturing method is provided. During this method, a preform component is provided for a turbine engine. The preform component includes a substrate comprising electrically conductive material and an outer coating comprising non-electrically conductive material applied over a surface of the substrate. A portion of the substrate is removed using an electric current discharged from an electrode to form a meter section of a cooling aperture in the substrate. Fluid is directed through a bore of the electrode against a backside of the outer coating to form a pilot hole in the outer coating. A diffuser section of the cooling aperture is formed in at least the outer coating using a laser machining process.

The forming of the preform aperture may include: removing a portion of the substrate using an electric current discharged from an electrode to form the meter section; and directing fluid through a bore of the electrode to liberate a portion of the outer coating and form the pilot hole.

The diffuser section may be aligned with the meter section based on a location of the pilot hole.

The forming of the preform aperture may include: removing a portion of the substrate using an electric current discharged from the electrical discharge machining electrode to form the meter section; and directing fluid through a bore of the electrical discharge machining electrode to puncture the outer coating and form the pilot hole.

The diffuser section may be formed in the preform component based on a location of the pilot hole.

The pilot hole may be expanded within the outer coating during the forming of the diffuser section.

The diffuser section may extend into the substrate.

The preform component may also include an inner coating between the substrate and the outer coating. The preform aperture may extend through the inner coating.

The inner coating may include electrically conductive material that is different than the electrically conductive material of the substrate.

The electrically conductive material may be configured as or otherwise include metal. The non-electrically conductive material may be configured as or otherwise include ceramic.

The second machining process may be or otherwise include a laser machining process.

The second machining process may be or otherwise include a water-jet guided laser machining process.

The second machining process may be or otherwise include an abrasive water jet machining process.

The providing of the preform component may include applying the outer coating over the substrate.

The diffuser section may be configured as a single lobe diffuser section.

The diffuser section may be configured as a multi lobe diffuser section.

The preform component may be configured as or otherwise include a preform of an airfoil for the turbine engine.

The preform component may be configured as or otherwise include a preform of a flowpath wall for the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods for manufacturing fluid cooled components of a gas turbine engine. For ease of description, the turbine engine may be described below as a turbofan turbine engine. The present disclosure, however, is not limited to such an exemplary gas turbine engine. The turbine engine, for example, may alternatively be configured as a turbojet turbine engine, a turboprop turbine engine, a turboshaft turbine engine, a propfan turbine engine, a pusher fan turbine engine or an auxiliary power unit (APU) turbine engine. The turbine engine may be configured as a geared turbine engine or a direct drive turbine engine. The present disclosure is also not limited to aircraft applications. The turbine engine, for example, may alternatively be configured as a ground-based industrial turbine engine for power generation, or any other type of turbine engine which utilizes fluid cooled components.

Figure 1:
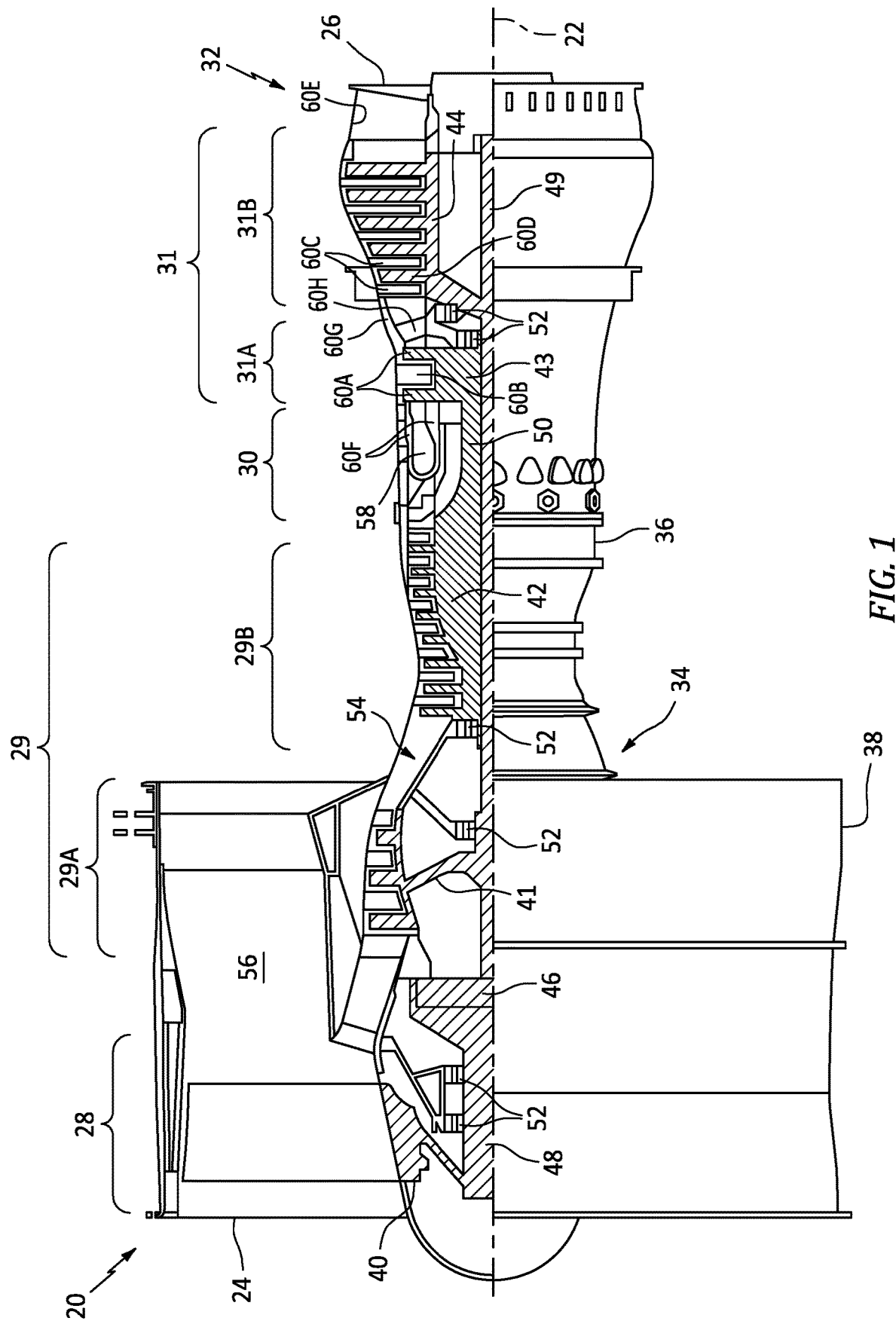
FIG. 1 is a side cutaway illustration of a geared turbofan turbine engine.

FIG. 1 is a side cutaway illustration of the turbofan turbine engine 20. This turbine engine 20 extends along an axial centerline 22 between a forward, upstream airflow inlet 24 and an aft, downstream airflow exhaust 26. The turbine engine 20 includes a fan section 28, a compressor section 29, a combustor section 30, a turbine section 31 and an exhaust section 32 (partially shown in FIG. 1). The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31 are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A-31B; e.g., an engine core. The outer case 38 may house at least the fan section 28.

Each of the engine sections 28, 29A, 29B, 31A and 31B includes a respective rotor 40-44. Each of these rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a gear train 46, for example, through a fan shaft 48. The gear train 46 and the LPC rotor 41 are connected to and driven by the LPT rotor 44 through a low speed shaft 49. The HPC rotor 42 is connected to and driven by the HPT rotor 43 through a high speed shaft 50. The shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During operation, air enters the turbine engine 20 through the airflow inlet 24. This air is directed through the fan section 28 and into a core flowpath 54 and a bypass flowpath 56. The core flowpath 54 extends sequentially through the engine sections 29A-32. The air within the core flowpath 54 may be referred to as "core air". The bypass flowpath 56 extends through a bypass duct, which bypasses the engine core. The air within the bypass flowpath 56 may be referred to as "bypass air".

The core air is compressed by the LPC rotor 41 and the HPC rotor 42 and directed into a combustion chamber 58 of a combustor in the combustor section 30. Fuel is injected into the combustion chamber 58 and mixed with the compressed core air to provide a fuel-air mixture. This fuel air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the fan rotor 40, which propels bypass air through and out of the bypass flowpath 56. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

The turbine engine 20 includes a plurality of fluid cooled components (e.g., 60A-H; generally referred to as "60") arranged within, for example, the combustor section 30, the turbine section 31 and/or the exhaust section 32. Examples of these fluid cooled components 60 include airfoils such as, but not limited to, a rotor blade airfoil (e.g., 60A, 60D) and a stator vane airfoil (e.g., 60B, 60C, 60H). Other examples of the fluid cooled components 60 include flowpath walls such as, but not limited to, a combustor wall (e.g., 60F), an exhaust duct wall (e.g., 60E), a shroud or other flowpath wall (e.g., 60G), a rotor blade platform and a stator vane platform. Of course, various other fluid cooled components may be included in the turbine engine 20, and the present disclosure is not limited to any particular types or configurations thereof.

Figure 2:
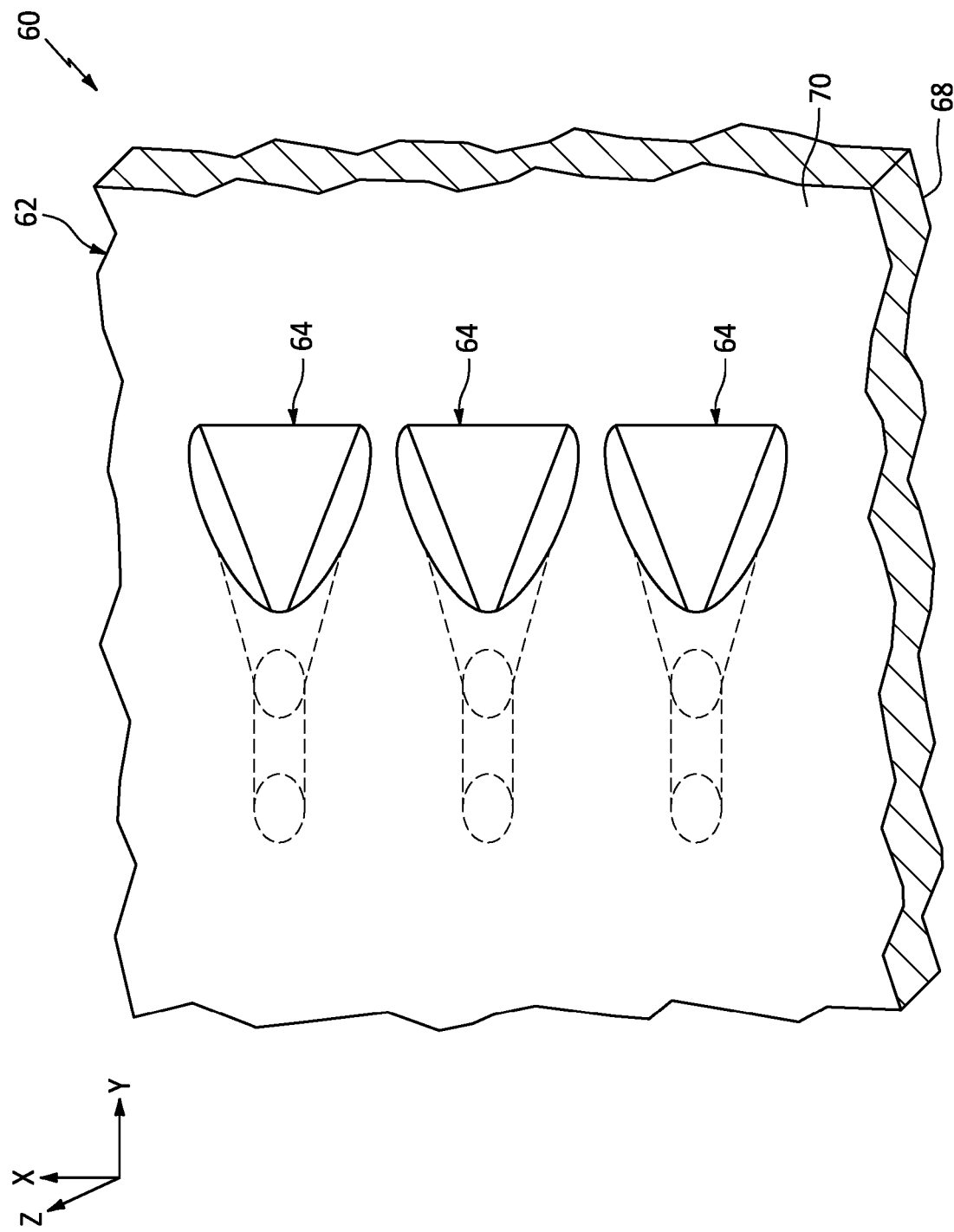
FIG. 2 is a perspective illustration of a portion of a fluid cooled component.

FIG. 2 illustrates a portion of one of the fluid cooled components 60 within the turbine engine 20. This fluid cooled component 60 has a component wall 62 (e.g., a sidewall or an endwall) configured with one or more cooling apertures 64.

Figure 3:
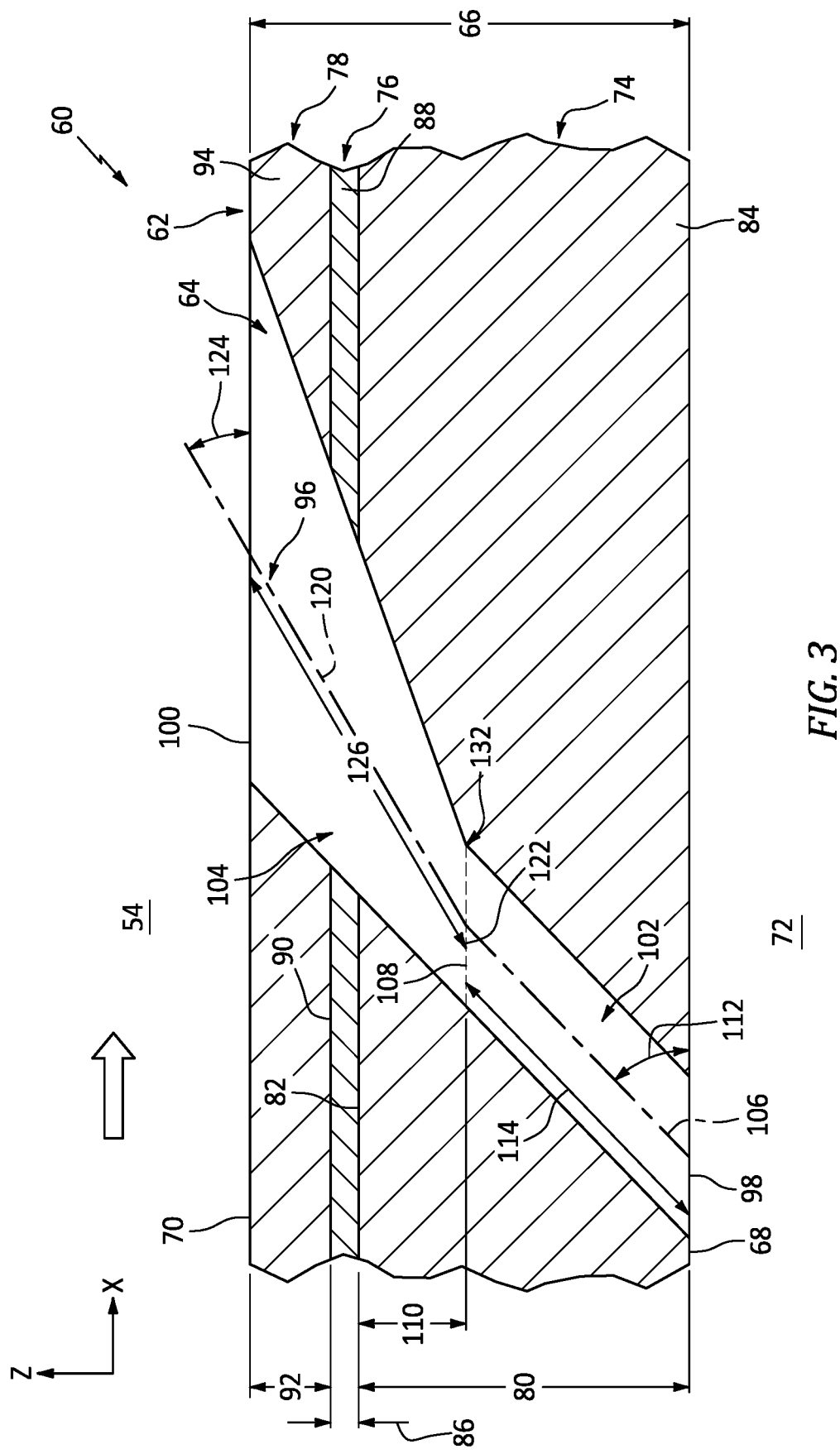
FIG. 3 is a sectional illustration of a portion of the fluid cooled component taken along a centerline of a cooling aperture.

Referring to FIG. 3, the component wall 62 has a thickness 66 that extends vertically (e.g., along a z-axis) between and to a first surface 68 and a second surface 70. The component first surface 68 may be configured as an interior and/or a cold side surface of the component wall 62. The component first surface 68, for example, may at least partially form a peripheral boundary of a cooling fluid volume 72 (e.g., a cavity or a passage) along the component wall 62. The component first surface 68 may thereby be subject to relatively cool fluid (e.g., cooling air) supplied to the cooling fluid volume 72. This cooling fluid volume 72 may be an internal volume formed within the fluid cooled component 60 where, for example, the component is an airfoil. Alternatively, the cooling fluid volume 72 may be an external volume formed external to the fluid cooled component 60 where, for example, the component is a flowpath wall. The component second surface 70 may be configured as an exterior and/or a hot side surface of the component wall 62. The component second surface 70, for example, may at least partially form a peripheral boundary of a portion of, for example, the core flowpath 54 along the component wall 62. The component second surface 70 may thereby be subject to relative hot fluid (e.g., combustion products) flowing through the core flowpath 54 within, for example, one of the engine sections 30-32 of FIG. 1.

The component wall 62 of FIG. 3 includes a component substrate 74 and one or more external component coatings 76 and 78. The component substrate 74 at least partially or completely forms and carries the component first surface 68. The component substrate 74 has a thickness 80 that extends vertically (e.g., along the z-axis) between and to the component first surface 68 and a second surface 82 of the component substrate 74. This substrate second surface 82 may be configured as an exterior surface of the component substrate 74 prior to being (e.g., partially or completely) covered by the one or more component coatings 76 and 78. The substrate thickness 80 may be greater than one-half (½) of the wall thickness 66. The substrate thickness 80, for example, may be between two-third (⅔) and four-fifths (⅘) of the wall thickness 66.

The component substrate 74 is constructed from substrate material 84. This substrate material 84 may be an electrically conductive material. The substrate material 84, for example, may be or otherwise include metal. Examples of the metal include, but are not limited to, nickel (Ni), titanium (Ti), aluminum (Al), chromium (Cr), cobalt (Co), and alloys thereof. The metal, for example, may be a nickel or cobalt based superalloy such as, but not limited to, PWA 1484 or PWA 1429.

The inner coating 76 may be configured as a bond coating between the component substrate 74 and the outer coating 78. The inner coating 76 of FIG. 3 is bonded (e.g., directly) to the substrate second surface 82. The inner coating 76 at least partially or completely covers the substrate second surface 82 (e.g., along an x-y plane of FIG. 2). The inner coating 76 has a thickness 86 that extends vertically (e.g., along the z-axis) between and to component substrate 74 and the outer coating 78. This inner coating thickness 86 may be less than one-seventh (1/7) of the wall thickness 66. The inner coating thickness 86, for example, may be between one-eighth (⅛) and one-fortieth (1/40) of the wall thickness 66.

The inner coating 76 is constructed from inner coating material 88. This inner coating material 88 may be an electrically conductive material. The inner coating material 88, for example, may be or otherwise include metal. Examples of the metal include, but are not limited to, MCrAlY and MAlCrX, where "M" is nickel (Ni), cobalt (Co), iron (Fe) or any combination thereof, and where "Y" or "X" is hafnium (Hf), yttrium (Y), silicon (Si) or any combination thereof. The MCrAlY and MAlCrX may be further modified with strengthening elements such as, but not limited to, tantalum (Ta), rhenium (Re), tungsten (W), molybdenum (Mo) or any combination thereof. An example of the MCrAlY is PWA 286.

The inner coating 76 may be formed from a single layer of the inner coating material 88. The inner coating 76 may alternatively be formed from a plurality of layers of the inner coating material 88, where the inner coating material 88 within each of those inner coating layers may be the same as one another or different from one another.

The outer coating 78 may be configured as a protective coating for the component substrate 74 and, more generally, the fluid cooled component 60. The outer coating 78, for example, may be configured as a thermal barrier layer and/or an environmental layer. The outer coating 78 at least partially or completely forms and carries the component second surface 70. The outer coating 78 of FIG. 2 is bonded (e.g., directly) to a second (e.g., exterior) surface 90 of the inner coating 76. The outer coating 78 at least partially or completely covers the inner coating second surface 90 as well as the underlying substrate second surface 82 (e.g., along an x-y plane of FIG. 2). The outer coating 78 has a thickness 92 that extends vertically (e.g., along the z-axis) between and to the inner coating 76 and the component second surface 70. This outer coating thickness 92 may be less than one-half (½) of the wall thickness 66. The outer coating thickness 92, for example, may be between one-third (⅓) and one-eighth (⅛) of the wall thickness 66. The outer coating thickness 92, however, may be greater than the inner coating thickness 86.

The outer coating 78 is constructed from outer coating material 94. This outer coating material 94 may be a non-electrically conductive material. The outer coating material 88, for example, may be or otherwise include ceramic. Examples of the ceramic include, but are not limited to, yttria stabilized zirconia (YSZ) and gadolinium zirconate (GdZ). The outer coating material 94 of the present disclosure is not limited to non-electrically conductive materials. In other embodiments, for example, the outer coating material 94 may be an electrically conductive material; e.g., metal.

The outer coating 78 may be formed from a single layer of the outer coating material 94. The outer coating 78 may alternatively be formed from a plurality of layers of the outer coating material 94, where the outer coating material 94 within each of those outer coating layers may be the same as one another or different from one another. For example, the outer coating 78 may include a thin interior layer of the YSZ and a thicker exterior later of the GdZ.

Each of the cooling apertures 64 extends along a respective longitudinal centerline 96 between and to an inlet 98 of the respective cooling aperture 64 and an outlet 100 of the respective cooling aperture 64. The cooling aperture inlet 98 of FIG. 3 is located in the component first surface 68. The cooling aperture inlet 98 thereby fluidly couples its respective cooling aperture 64 with the cooling fluid volume 72 along the component first surface 68. The cooling aperture outlet 100 of FIG. 3 is located in the component second surface 70. The cooling aperture outlet 100 thereby fluidly couples its respective cooling aperture 64 with the core flowpath 54 along the component second surface 70.

Each of the cooling apertures 64 may include a meter section 102 and a diffuser section 104. The meter section 102 is disposed at (e.g., on, adjacent or proximate) the cooling aperture inlet 98. The meter section 102 is configured to meter (e.g., regulate) a flow of cooling fluid flowing from the cooling fluid volume 72, through the substrate material 84, to the diffuser section 104. The diffuser section 104 is disposed at the cooling aperture outlet 100. The diffuser section 104 is configured to diffuse the cooling fluid exhausted (e.g., directed out) from the cooling aperture outlet 100 into, for example, a film for cooling a downstream portion of the component second surface 70.

The meter section 102 of FIG. 3 extends longitudinally along the longitudinal centerline 96 within (e.g., partially into) the component substrate 74. More particularly, the meter section 102 extends longitudinally along a meter segment 106 of the longitudinal centerline 96 (e.g., a centerline of the meter section 102) from the cooling aperture inlet 98 to an outlet 108 of the meter section 102. The meter section outlet 108 of FIG. 3 is disposed vertically within the component substrate 74 intermediately between the component first surface 68 and the substrate second surface 82. The meter section outlet 108 of FIG. 3 is thereby vertically recessed into the component substrate 74 by a vertical distance 110 (e.g., along the z-axis).

The longitudinal centerline 96 and its (e.g., entire) meter segment 106 of FIG. 3 are angularly offset from the component first surface 68 by an included angle 112. This meter segment angle 112 may be an acute angle, or a right angle. The meter segment angle 112, for example, may be between ten degrees (10°) and eighty degrees (80°); e.g., between twenty degrees (20°) and thirty degrees (30°).

The meter section 102 has a longitudinal length 114 measured along the meter segment 106 between the cooling aperture inlet 98 and the meter section outlet 108.

Figure 4:
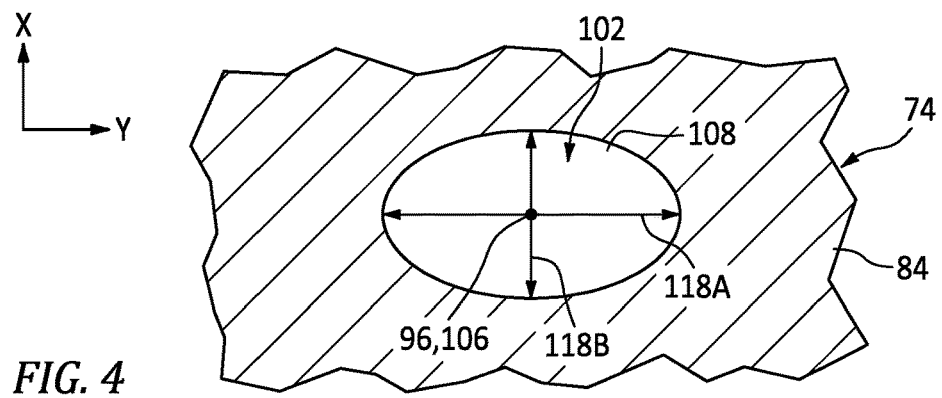
FIG. 4 is a cross-sectional illustration of a portion of the fluid cooled component at a meter section outlet of the cooling aperture.

Referring to FIG. 4, the meter section 102 has a first lateral width 118A (e.g., a major axis dimension; e.g., along the y-axis) and a second lateral width 118B (e.g., a minor axis dimension; e.g., along the x-axis). These lateral widths 118A and 118B (generally referred to as "118") may be measured, for example, along/within a plane parallel with the component first surface 68 and/or the component second surface 70 (see FIG. 3); e.g., the x-y plane. The first lateral width 118A of FIG. 4 is greater than the second lateral width 118B. However, in other embodiments, the first lateral width 118A may be equal to or less than the second lateral width 118B.

The meter section 102 has a cross-sectional geometry when viewed, for example, in a (e.g., x-y plane) plane parallel with the component first surface 68 and/or the component second surface 70 (see FIG. 3); e.g., the plane of FIG. 4. This meter section cross-sectional geometry may be uniform (e.g., remain constant) along the longitudinal length 114 of the meter section 102. The meter section cross-sectional geometry of FIG. 4 has a rounded shape. Examples of the rounded shape include, but are not limited to, an oval, an ellipse and a circle. The present disclosure, however, is not limited to the foregoing exemplary meter section cross-sectional geometry shapes as discussed below in further detail.

The diffuser section 104 of FIG. 3 extends longitudinally along the longitudinal centerline 96 out of the component substrate 74, through the inner coating 76 and the outer coating 78. More particularly, the diffuser section 104 of FIG. 3 extends longitudinally along a diffuser segment 120 of the longitudinal centerline 96 (e.g., a centerline of the diffuser section 104) from an inlet 122 of the diffuser section 104 (here, also the meter section outlet 108), through the materials 84, 88 and 94, to the cooling aperture outlet 100. The diffuser section inlet 122 of FIG. 3 is disposed vertically within the component substrate 74 intermediately between the component first surface 68 and the substrate second surface 82. The diffuser section inlet 122 of FIG. 3 is thereby vertically recessed into the component substrate 74 by the vertical distance 110 (e.g., along the z-axis).

The longitudinal centerline 96 and its (e.g., entire) diffuser segment 120 of FIG. 3 are angularly offset from the component second surface 70 by an included angle 124. This diffuser segment angle 124 may be an acute angle. The diffuser segment angle 124, for example, may be between twenty degrees (20°) and eighty degrees (80°); e.g., between thirty-five degrees (35°) and fifty-five degrees (55°). The diffuser segment angle 124 of FIG. 3 is different (e.g., less) than the meter segment angle 112. The diffuser segment 120 may thereby be angularly offset from the meter segment 106.

The diffuser section 104 has a longitudinal length 126 measured along the diffuser segment 120 between the diffuser section inlet 122 and the cooling aperture outlet 100. This diffuser section longitudinal length 126 may be equal to or different (e.g., less or greater) than the meter section longitudinal length 114.

Figure 5:
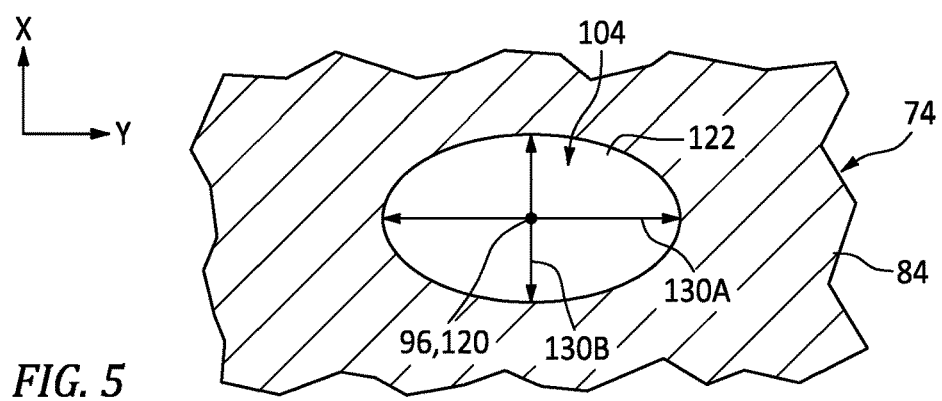
FIG. 5 is a cross-sectional illustration of a portion of the fluid cooled component at a diffuser section inlet of the cooling aperture.

Referring to FIG. 5, the diffuser section 104 has a first lateral width 130A (e.g., a major axis dimension; e.g., along the y-axis) and a second lateral width 130B (e.g., a minor axis dimension; e.g., along the x-axis). These lateral widths 130A and 130B (generally referred to as "130") may be measured, for example, along/within a plane parallel with the component first surface 68 and/or the component second surface 70 (see FIG. 3); e.g., the x-y plane. The first lateral width 130A of FIG. 5 is greater than the second lateral width 130B. However, in other embodiments, the first lateral width 130A may be equal to or less than the second lateral width 130B.

The first lateral width 130A and the corresponding first lateral width 118A (see FIG. 4) at an interface 132 (see FIG. 3) between the meter section 102 and the diffuser section 104 are equal. Similarly, the second lateral width 130B and the corresponding second lateral width 118B (see FIG. 4) at the interface 132 (see FIG. 3) between the meter section 102 and the diffuser section 104 are equal. However, the lateral widths 130 of the diffuser section 104 at other locations along the longitudinal centerline 96 may be greater the corresponding lateral widths 118 of the meter section 102 (see FIG. 4). More particularly, the diffuser section 104 of FIG. 3 (see also transition from FIG. 5 to FIG. 6) laterally diverges as the diffuser section 104 projects longitudinally away from the meter section 102 towards or to the cooling aperture outlet 100.

Referring to FIG. 5, the diffuser section 104 has a cross-sectional geometry when viewed, for example, in a plane parallel with the component first surface 68 and/or the component second surface 70 (see FIG. 3); e.g., the x-y plane. At the interface 132, the diffuser section cross-sectional geometry is the same as the meter section cross-sectional geometry (see FIG. 4). The diffuser section cross-sectional geometry of FIG. 5, for example, has a rounded shape. Examples of the rounded shape include, but are not limited to, an oval, an ellipse and a circle. The present disclosure, however, is not limited to the foregoing exemplary diffuser section cross-sectional geometry shapes as discussed below in further detail.

Figure 6:
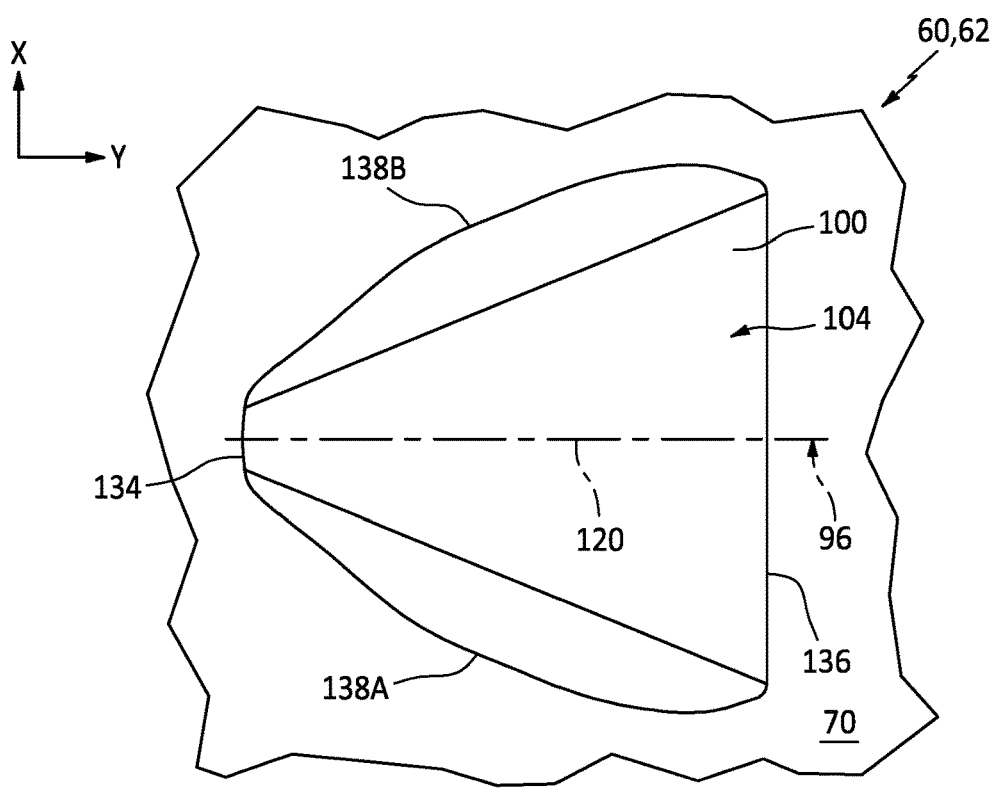
FIG. 6 is a side illustration of a portion of the fluid cooled component at an outlet of the cooling aperture and its diffuser section.

Referring to FIGS. 3, 5 and 6, a shape and/or dimensions of the diffuser section cross-sectional geometry change as the diffuser section 104 projects longitudinally away from the meter section 102, e.g. sequentially through the materials 84, 88 and 94 of FIG. 3, to the cooling aperture outlet 100. For example, at the cooling aperture outlet 100 of FIG. 6, the diffuser section cross-sectional geometry may have a complex shape when viewed, for example, in a plane parallel with the component first surface 68 and/or the component second surface 70; e.g., the x-y plane. This diffuser section cross-sectional geometry of FIG. 6 includes a (e.g., curved or straight) leading edge section 134, a (e.g., curved or straight) trailing edge section 136 and opposing (e.g., curved or straight; concave, convex and/or splined) sidewall sections 138A and 138B (generally referred to as "138"). Each of the sidewall sections 138 extends between and to respective ends of the leading and the trailing edge sections 134 and 136. A lateral width of the leading edge section 134 may be different (e.g., smaller) than a lateral width of the trailing edge section 136. The sidewall sections 138 may thereby generally laterally diverge away from one another as the sidewall sections 138 extend from the leading edge section 134 to the trailing edge section 136.

Figure 8:
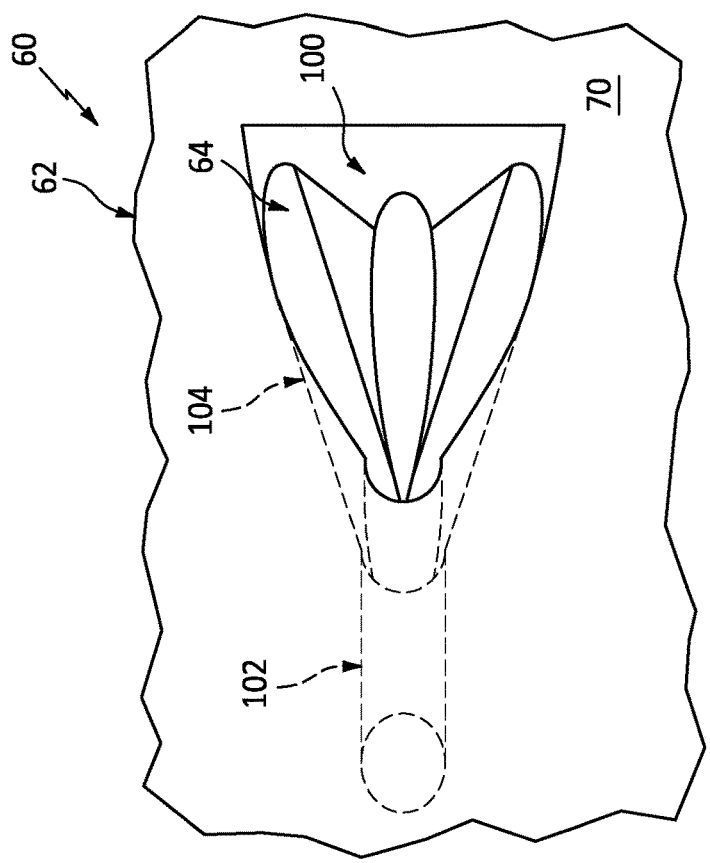
FIGS. 7 and 8 are side illustrations of portions of the fluid cooled component configured with various multi-lobed cooling apertures.
Figure 7:
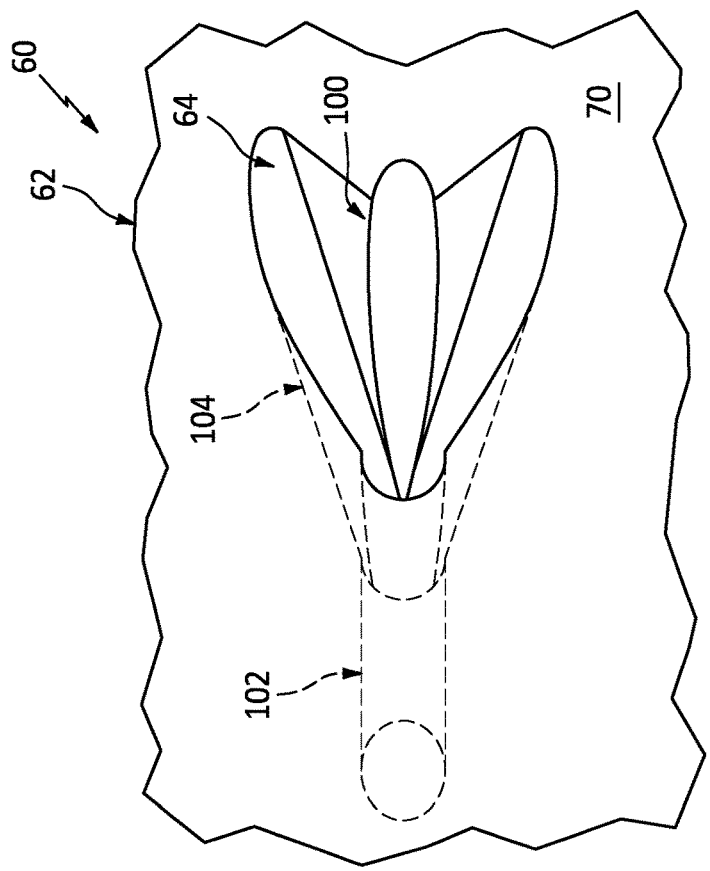

In some embodiments, referring to FIG. 6, the diffuser section 104 may be configured as a single lobe diffuser section. In other embodiments, referring to FIGS. 7 and 8, the diffuser section 104 may be configured as a multi-lobe diffuser section. Various other single lobe and multi-lobe diffuser sections for cooling apertures are known in the art, and the present disclosure is not limited to any particular ones thereof. Further details on various multi-lobe diffuser sections can be found in U.S. Pat. No. 9,598,979, which is assigned to the assignee of the present disclosure and hereby incorporated herein by reference in its entirety.

Figure 9:
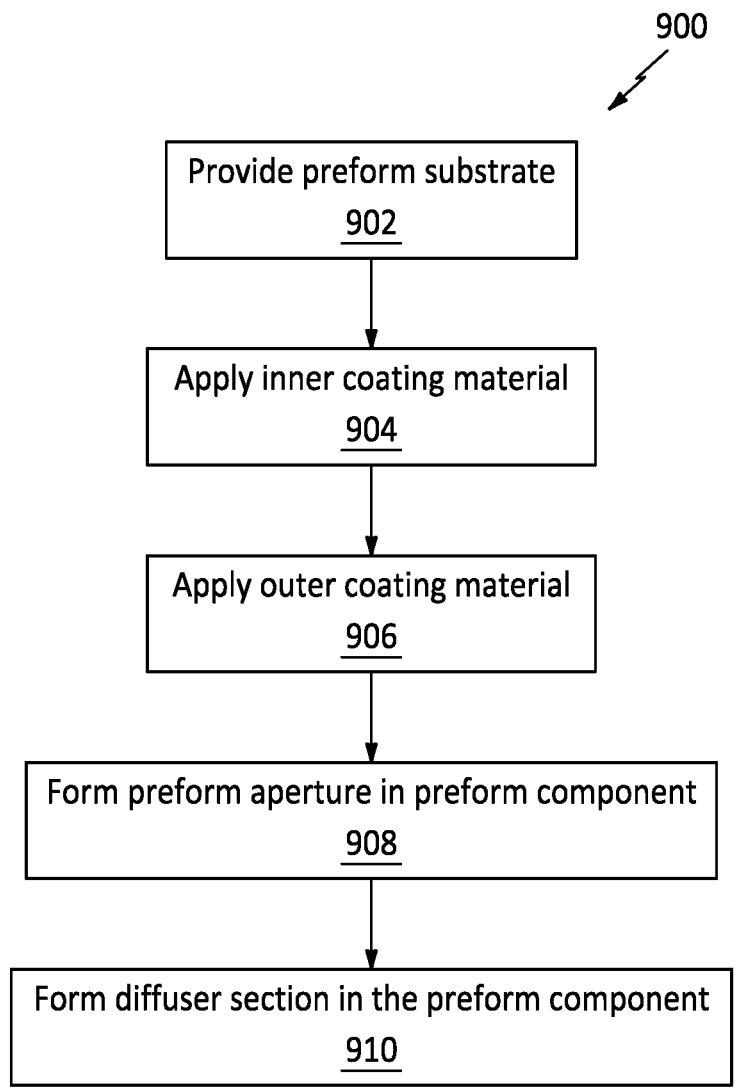
FIG. 9 is a flow diagram of a method for manufacturing a fluid cooled component.

FIG. 9 is a flow diagram of a method 900 for manufacturing a fluid cooled component. For ease of description, the method 900 is described below with reference to the fluid cooled component 60 described above. The method 900 of the present disclosure, however, is not limited to manufacturing such an exemplary fluid cooled component.

Figure 10:
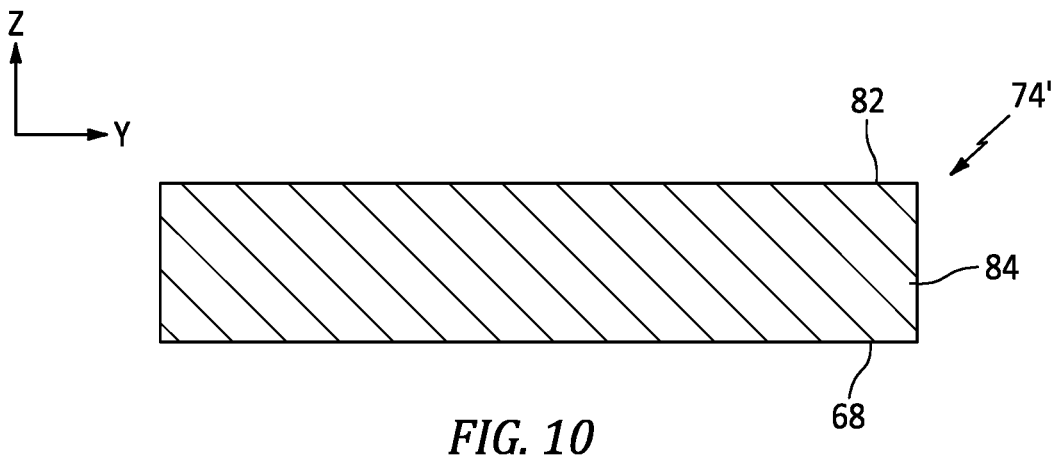
FIG. 10 is a sectional illustration of a portion of a preform substrate.

In step 902, a preform substrate 74' is provided. Referring to FIG. 10, the preform substrate 74' may generally have the configuration (e.g., shape, size, etc.) of the substrate 74 for the fluid cooled component 60 to be formed (e.g., see FIG. 3). The preform substrate 74' of FIG. 10, however, does not include any holes therein for forming the cooling apertures 64.

Figure 11:
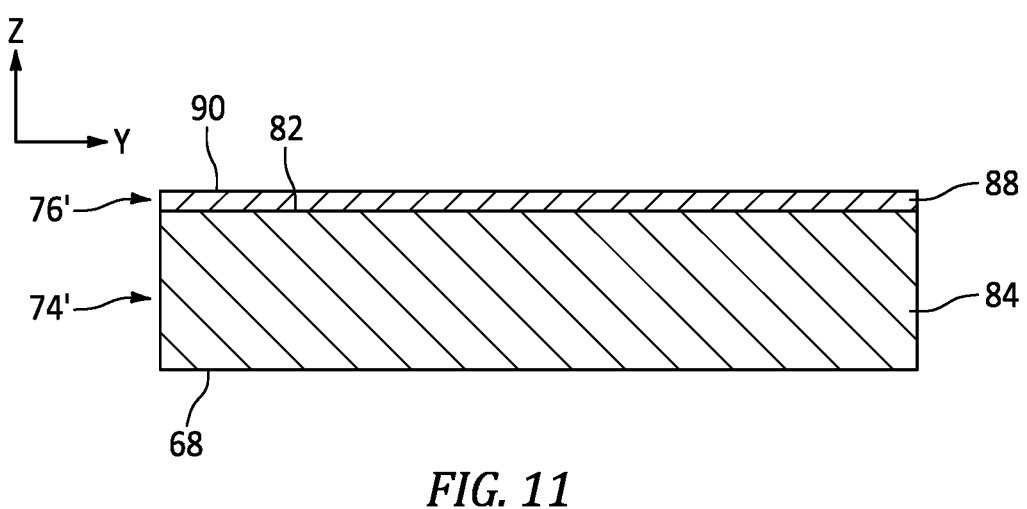
FIG. 11 is a sectional illustration of a portion of the preform substrate configured with a preform inner coating.

In step 904, a preform inner coating 76' is applied over the preform substrate 74'. For example, referring to FIG. 11, the inner coating material 88 may be applied (e.g., deposited) onto the second surface 82 of the preform substrate 74'. The inner coating material 88 may be applied using various inner coating application techniques. Examples of the inner coating application techniques include, but are not limited to, a physical vapor deposition (PVD) process, chemical vapor deposition (CVD) process, a plating process, and a thermal spray process (e.g., a plasma spray (PS) process, a high velocity oxygen fuel (HVOF) process, high velocity air fuel (HVAF) process, a wire spray process or a combustion spray process). The inner coating application may be performed via a non-line-of-sight (NLOS) coating process or a direct-line-of-sight (DLOS) coating process. The preform inner coating 76' of FIG. 11 may generally have the configuration of the inner coating 76 for the fluid cooled component 60 to be formed (e.g., see FIG. 3). The preform inner coating 76' of FIG. 11, however, does not include any holes for forming the cooling apertures 64.

Figure 12:
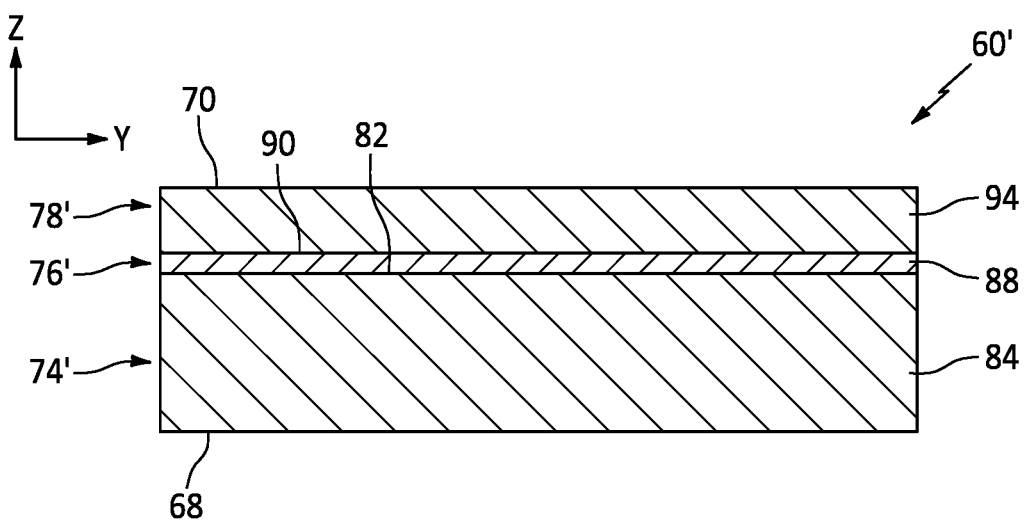
FIG. 12 is a sectional illustration of a portion of the preform substrate further configured with a preform outer coating.

In step 906, a preform outer coating 78' is applied over the preform substrate 74' and the preform inner coating 76'. For example, referring to FIG. 12, the outer coating material 94 may be applied (e.g., deposited) onto the second surface 90 of the preform inner coating 76'. The outer coating material 94 may be applied using various outer coating application techniques. Examples of the outer coating application techniques include, but are not limited to, a physical vapor deposition (PVD) process (e.g., an electron-beam PVD process), chemical vapor deposition (CVD) process, a thermal spray process (e.g., a plasma spray (PS) process, a high velocity oxygen fuel (HVOF) process, high velocity air fuel (HVAF) process, a wire spray process or a combustion spray process). The outer coating application may be performed via a non-line-of-sight (NLOS) coating process or a direct-line-of-sight (DLOS) coating process. The preform outer coating 78' of FIG. 12 may generally have the configuration of the outer coating 78 for the fluid cooled component 60 to be formed (e.g., see FIG. 3). The preform outer coating 78' of FIG. 12, however, does not include any holes for forming the cooling apertures 64.

The combination of the preform substrate 74', the preform inner coating 76' and the preform outer coating 78' may provide a preform component 60'. This preform component 60' of FIG. 12 may generally have the configuration of the fluid cooled component 60 to be formed (e.g., see FIG. 3). The preform component 60' of FIG. 12, however, does not include any holes for forming the cooling apertures 64.

Figure 13:
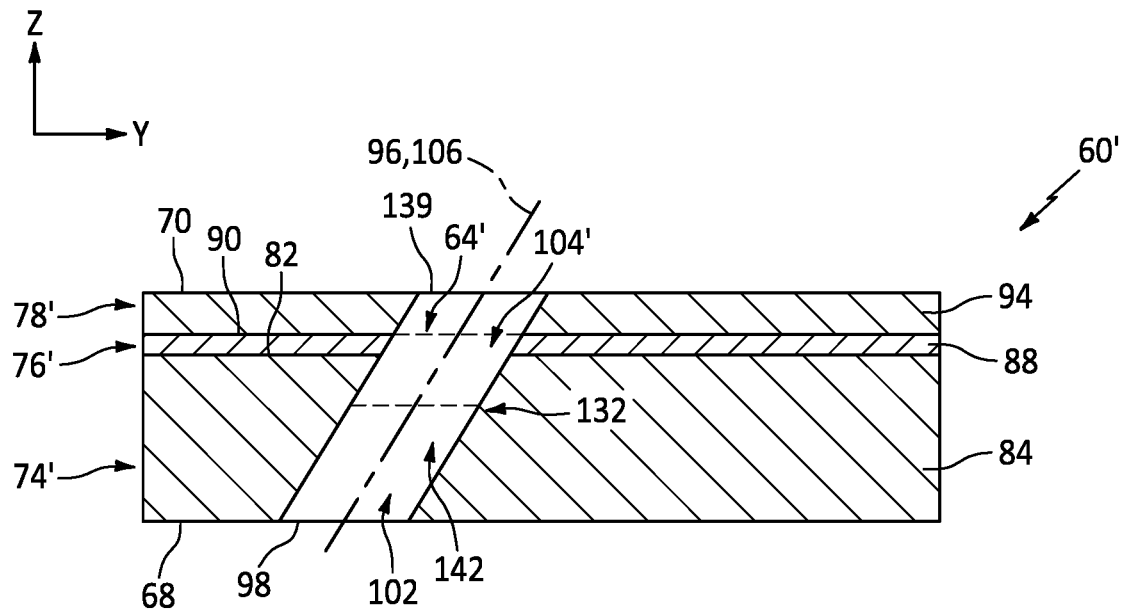
FIG. 13 is a sectional illustration of a portion of a preform component configured with a preform aperture.

In step 908, a preform aperture 64' is formed in the preform component 60'. For example, referring to FIG. 13, a portion of the component material (here, a combination of the materials 84, 88 and 94) is machined away (from the interior of the preform component 60') to form the preform aperture 64'. This preform aperture 64' extends longitudinally through the preform component 60' and its various layers 74', 76' and 78' along the meter segment 106 from the first surface 68 of the preform component 60' to the second surface 70 of the preform component 60'. The preform aperture 64' of FIG. 13 includes the meter section 102 of a respective cooling aperture 64. The preform aperture 64' of FIG. 13 also includes a preform diffuser section 104'. This preform diffuser section 104' may generally be configured as an extension of the meter section 102 which continues to extend longitudinally along a trajectory of the meter segment 106 out of the substrate material 84, through the coating materials 88 and 94, to an orifice 139 in the second surface 70 of the preform substrate 60'.

Figure 14:
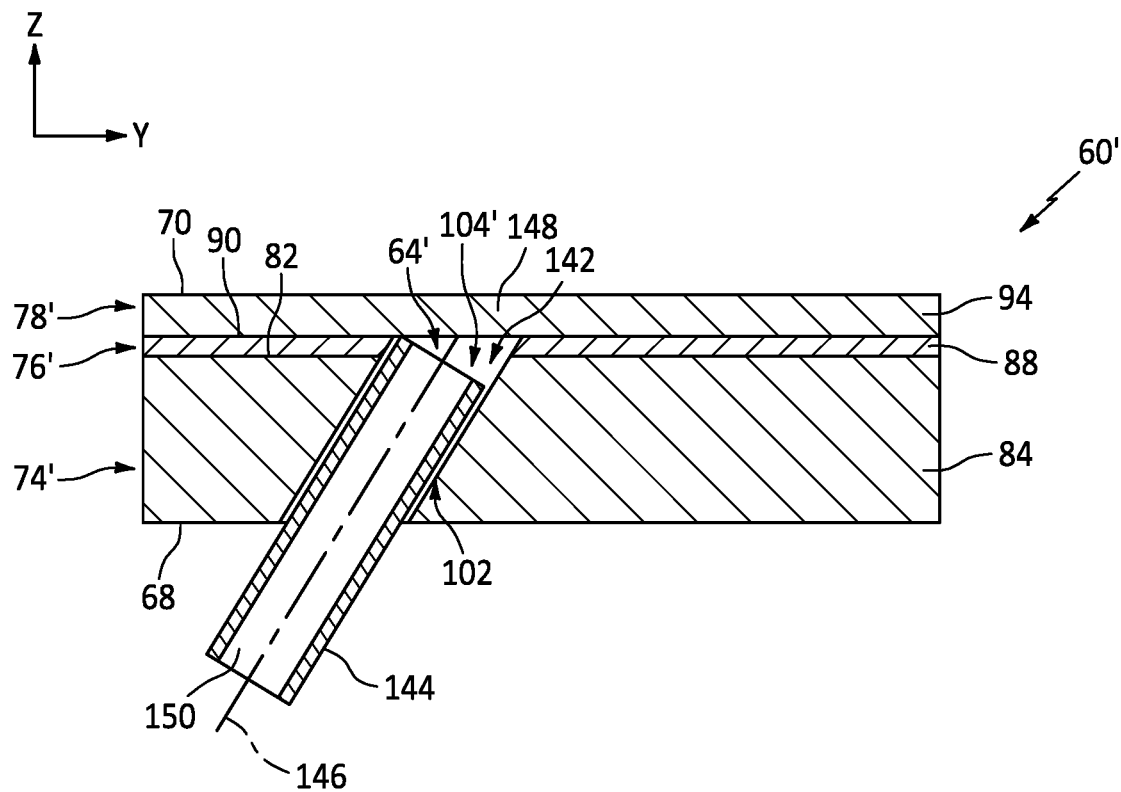
FIGS. 14 and 15 illustrate a sequence for forming the preform aperture in the preform component using an EDM electrode.

The preform aperture 64' may be formed using an electrical discharge machining (EDM) process. For example, referring to FIG. 14, a first portion 142 of the preform aperture 64' is formed in the electrically conductive material (e.g., 84, 88) of the preform component 60' using an electrical discharge machining (EDM) electrode 144. This EDM electrode 144 may be translated along an axis 146 (e.g., coaxial with the meter segment 106; see FIG. 3) towards the first surface 68, and then into the preform component 60' towards the second surface 70. As the EDM electrode 144 is translated along the axis 146, an electric current is discharged into the electrically conductive material (e.g., 84, 88). The discharge of the electric current may remove (e.g., erode, burn away, etc.) a respective portion of the electrically conductive material (e.g., 84, 88) along a path of a tip of the EDM electrode 144. The EDM electrode 144 may thereby form the meter section 102 in the substrate material 84 as well as respective portions of the preform diffuser section 104' in the substrate material 84 and the inner coating material 88.

Figure 15:
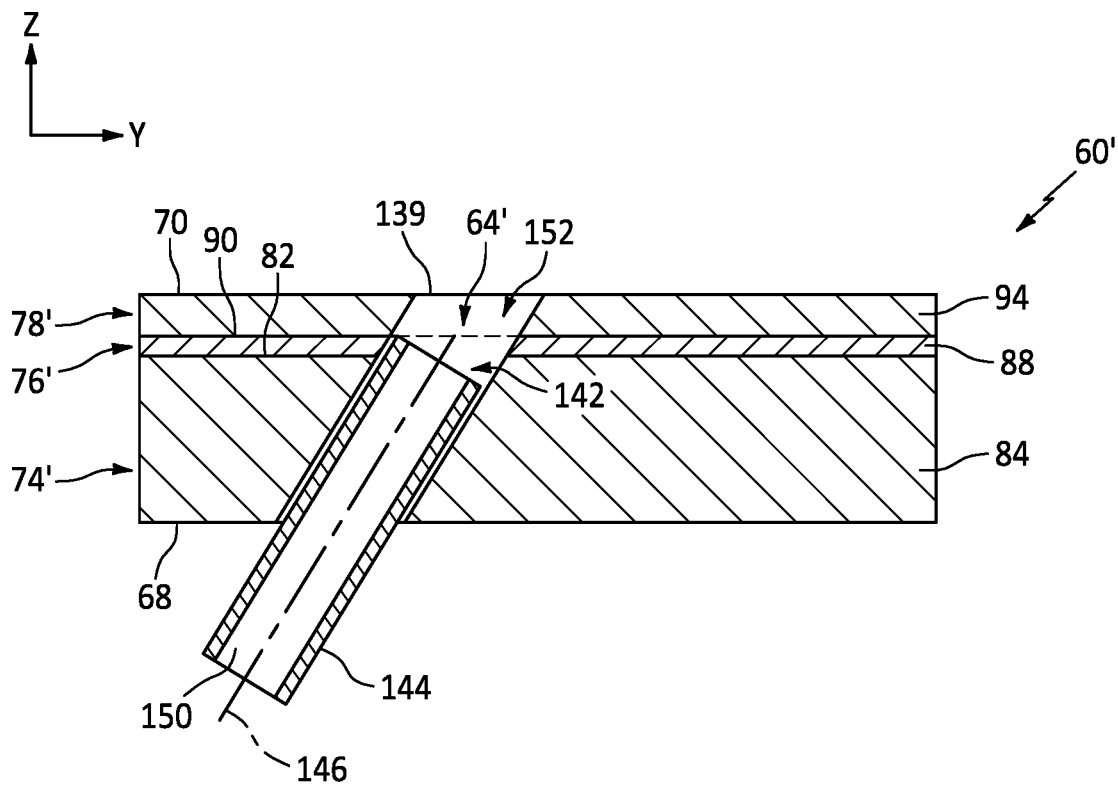

Once a corresponding portion of the preform aperture 64' is formed through the inner coating material 88, a portion 148 of the outer coating material 94 overlapping the first portion 142 of the preform aperture 64' may be substantially unsupported. Referring to FIG. 15, a pressure force exerted by a stream of (e.g., pressurized) fluid directed out of a bore 150 of the EDM electrode 144 during the electrical discharge machining process may puncture a pilot hole 152 through the preform outer coating 78'; e.g., liberate at least some or all of the unsupported portion 142 (see FIG. 14) of the outer coating material 94. This pilot hole 152 forms a second portion of the preform aperture 64' which extends through the non-electrically conductive material 94. The electrical discharge machining process may thereby be used to form the preform aperture 64' through both the electrically conductive material(s) 84, 88 as well as the non-electrically conductive material 94.

Figure 16:
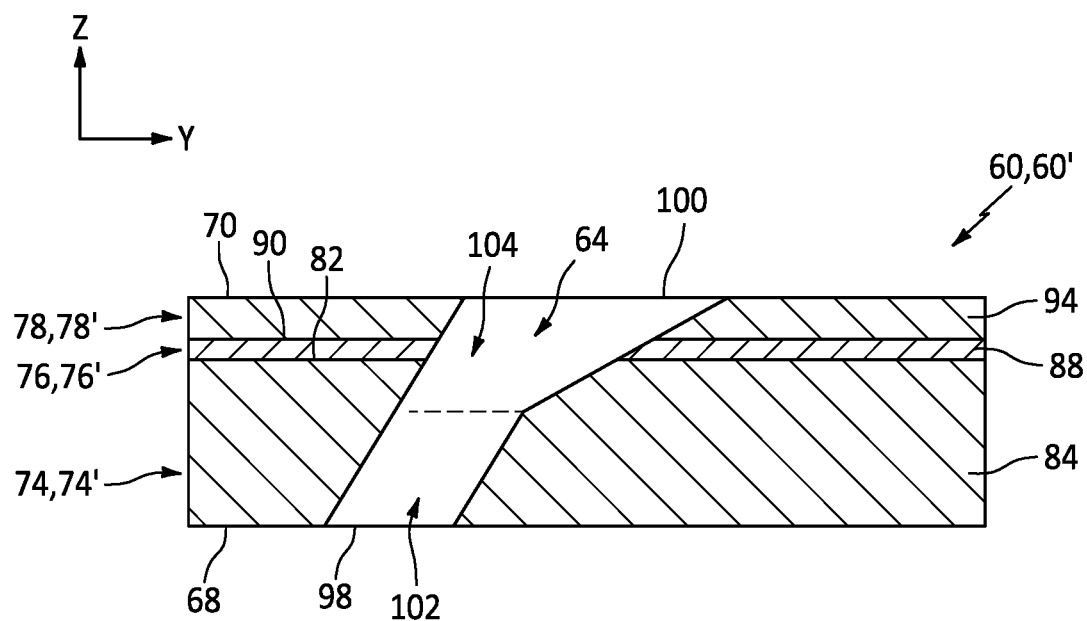
FIG. 16 is a sectional illustration of a portion of the preform substrate configured with a cooling aperture formed therein.

In step 910, the diffuser section 104 of the respective cooling aperture 64 is formed in the preform component 60'. For example, referring to FIG. 16, a portion of the outer coating material 94, a portion of the inner coating material 88 and a portion of the underlying substrate material 84 is machined away (from the exterior of the preform component 60') to provide the respective diffuser section 104. The diffuser section 104 may be formed in the various materials of the preform component 60' using a diffuser section machining process. This diffuser section machining process is selected to form the diffuser section 104 in the various different electrically conductive and non-electrically conductive materials in the preform component 60'. The diffuser section machining process is also selected to provide the diffuser section 104 with a precise finish geometry. Examples of the diffuser section machining process include, but are not limited to, a laser machining (e.g., ablation) process, a water-jet guided laser (WJGL) machining process, an abrasive water jet (AWJ) machining process, an electron beam machining process, and a mechanical drilling process. Following this formation step 910, the respective diffuser section 104 may be fully formed in the preform component 60', and the preform component 60' may now be the fully formed fluid cooled component 60.

During the formation step 910, the to-be-formed diffuser section 104 may be aligned with the meter section 102 based on a location of the pilot hole 152 through the preform outer coating 78'. For example, a processing system controlling the diffuser section machining process may determine the location and/or orientation of the meter section 102 based on the location and/or a visible orientation of the pilot hole 152. The diffuser section machining process may thereby be used to generally enlarge/expand the pilot hole 152 to provide the diffuser section 104.

For ease of description, the method 900 is described above with respect to formation of a single cooling aperture 64 of the fluid cooled component 60. However, the fluid cooled component 60 may be formed with multiple of the cooling apertures 64, for example, by repeating the formation steps 908 and 910 at multiple locations along the preform component 60'. When forming multiple cooling apertures 64, the formation step 908 will typically be repeated at multiple locations before performing the formations step 910 at those locations to finish forming the cooling apertures 64.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A manufacturing method, comprising:
   providing a preform component for a turbine engine, the preform component comprising a substrate comprising electrically conductive material having an outer coating comprising non-electrically conductive material applied over a surface of the substrate;
   forming a preform aperture in the preform component using an electrical discharge machining electrode, the preform aperture including a meter section in the substrate, the preform aperture further including a pilot hole in the outer coating, and the forming of the preform aperture comprising
      removing a portion of the substrate using an electric current discharged from the electrical discharge machining electrode to form the meter section; and
      directing fluid through a bore of the electrical discharge machining electrode to puncture the outer coating and form the pilot hole; and
   forming a diffuser section in at least the outer coating using a second machining process;
   wherein a cooling aperture includes the meter section and the diffuser section.

2. The manufacturing method of claim 1, wherein the diffuser section is formed in the preform component based on a location of the pilot hole.

3. The manufacturing method of claim 1, wherein the pilot hole is expanded within the outer coating during the forming of the diffuser section.

4. The manufacturing method of claim 1, wherein the diffuser section extends into the substrate.

5. The manufacturing method of claim 1, wherein the preform component further comprises an inner coating between the substrate and the outer coating, and the preform aperture extends through the inner coating.

6. The manufacturing method of claim 5, wherein the inner coating comprises electrically conductive material that is different than the electrically conductive material of the substrate.

7. The manufacturing method of claim 1, wherein the electrically conductive material comprises metal, and the non-electrically conductive material comprises ceramic.

8. The manufacturing method of claim 1, wherein the second machining process comprises a laser machining process.

9. The manufacturing method of claim 1, wherein the second machining process comprises a water-jet guided laser machining process.

10. The manufacturing method of claim 1, wherein the second machining process comprises an abrasive water jet machining process.

11. The manufacturing method of claim 1, wherein the providing of the preform component comprises applying the outer coating over the substrate.

12. The manufacturing method of claim 1, wherein the diffuser section is configured as a single lobe diffuser section.

13. The manufacturing method of claim 1, wherein the diffuser section is configured as a multi lobe diffuser section.

14. The manufacturing method of claim 1, wherein the preform component comprises a preform of an airfoil for the turbine engine.

15. The manufacturing method of claim 1, wherein the preform component comprises a preform of a flowpath wall for the turbine engine.

16. A manufacturing method, comprising:
   providing a preform component for a turbine engine, the preform component extending between a component first surface and a component second surface, the preform component comprising a substrate comprising metal and an outer coating comprising ceramic applied over a surface of the substrate;
   forming a preform aperture in the preform component starting at the component first surface using an electrical discharge machining process, the preform aperture including a meter section in the substrate, the preform aperture further including a pilot hole in the outer coating, and the forming of the preform aperture comprising
- removing a portion of the substrate using an electric current discharged from an electrode to form the meter section; and
- directing fluid through a bore of the electrode to liberate a portion of the outer coating and form the pilot hole; and forming a diffuser section in at least the outer coating using a second machining process;

wherein a cooling aperture includes the meter section and the diffuser section.

17. The manufacturing method of claim 16, wherein the diffuser section is aligned with the meter section based on a location of the pilot hole.

18. A manufacturing method, comprising:

providing a preform component for a turbine engine, the preform component comprising a substrate comprising electrically conductive material and an outer coating comprising non-electrically conductive material applied over a surface of the substrate;

removing a portion of the substrate using an electric current discharged from an electrode to form a meter section in the substrate;

directing fluid through a bore of the electrode against a backside of the outer coating to form a pilot hole in the outer coating; and forming a diffuser section in at least the outer coating using a laser machining process;

wherein a cooling aperture includes the meter section and the diffuser section.

* * * * *